(12) United States Patent
Hilberer

(10) Patent No.: US 8,512,208 B2
(45) Date of Patent: Aug. 20, 2013

(54) BRAKING SYSTEM FOR A UTILITY VEHICLE WHICH CAN BE COUPLED PNEUMATICALLY TO A TRAILER AND METHOD FOR OPERATING SUCH A BRAKING SYSTEM

(75) Inventor: Eduard Hilberer, Hockenheim (DE)

(73) Assignee: KNORR-BREMSE Systeme fuer Nutfahrzeuge GmbH, Munich (DE)

( * ) Notice: Subject to any disclaimer, the term of this patent is extended or adjusted under 35 U.S.C. 154(b) by 656 days.

(21) Appl. No.: 12/600,433

(22) PCT Filed: May 16, 2008

(86) PCT No.: PCT/EP2008/003952
§ 371 (c)(1),
(2), (4) Date: Jun. 8, 2010

(87) PCT Pub. No.: WO2008/138640
PCT Pub. Date: Nov. 20, 2008

(65) Prior Publication Data
US 2010/0304929 A1 Dec. 2, 2010

(30) Foreign Application Priority Data
May 16, 2007 (DE) .......................... 10 2007 023 345

(51) Int. Cl.
*B60T 13/22* (2006.01)
*B60T 7/20* (2006.01)
*B60T 13/00* (2006.01)
*B60W 10/04* (2006.01)

(52) U.S. Cl.
USPC ................. 477/199; 477/188; 188/3 R; 303/7

(58) Field of Classification Search
USPC ................. 477/183, 184, 188, 199, 201, 202; 188/3 R; 303/7, 127, 15; 701/71, 83
See application file for complete search history.

(56) References Cited

U.S. PATENT DOCUMENTS
3,592,315 A * 7/1971 Lewis ........................... 477/201
3,993,362 A 11/1976 Kamins et al.
(Continued)

FOREIGN PATENT DOCUMENTS
DE 3310768 A1 * 9/1984
DE 34 44 639 A1 6/1986
(Continued)

OTHER PUBLICATIONS
English translation of De19706982A, http://translationportal.epo.org, Nov. 14, 2012.*
(Continued)

*Primary Examiner* — Roger Pang
(74) *Attorney, Agent, or Firm* — Crowell & Moring LLP

(57) ABSTRACT

A braking system and method provided for a utility vehicle pneumatically coupled to a trailer. The system has an electronic control unit, a valve device that can be electrically connected by the at least one electronic control unit, the valve device building up pressure for the trailer braking system when connected, causing the trailer to brake, and a pressure sensor which detects the pressure for the trailer braking system and transmits a corresponding signal to the electronic control unit. The electronic control unit can influence the pressure generated for the trailer braking system by pulsed connection of the valve device, taking into account the pressure detected by the pressure sensor for the trailer braking system. The electronic control unit only allows the pulsed connection for braking the trailer when the service brake of the traction-vehicle is not activated, when conditions are such that the braking of the trailer could be useful in spite of a non-active service brake of the traction-vehicle, and when such an anti-jackknifing process is required by a signal generator.

16 Claims, 3 Drawing Sheets

(56) References Cited

U.S. PATENT DOCUMENTS

| | | | |
|---|---|---|---|
| 5,333,940 A | | 8/1994 | Topfer |
| 5,342,117 A | * | 8/1994 | Price et al. .................. 303/3 |
| 5,516,200 A | * | 5/1996 | Tezuka et al. ................ 303/7 |
| 5,806,938 A | * | 9/1998 | Stumpe et al. ............. 303/155 |
| 5,848,826 A | | 12/1998 | Mueller |
| 6,022,084 A | * | 2/2000 | Horn et al. .................. 303/7 |
| 6,845,851 B1 | * | 1/2005 | Donaldson et al. ........ 188/3 H |
| 8,152,243 B2 | * | 4/2012 | Bensch et al. ................ 303/7 |
| 2011/0168505 A1 | * | 7/2011 | Hilberer ................. 188/151 R |

FOREIGN PATENT DOCUMENTS

| | | |
|---|---|---|
| DE | 197 06 982 A1 | 9/1997 |
| DE | 198 57 393 A1 | 1/2000 |
| EP | 478952 A1 * | 4/1992 |
| EP | 0 532 863 A1 | 3/1993 |

OTHER PUBLICATIONS

International Search Report dated Nov. 6, 2008 including English translation (Four (4) pages).
German Office Action mailed Nov. 15, 2012.

* cited by examiner

BRAKING SYSTEM FOR A UTILITY VEHICLE WHICH CAN BE COUPLED PNEUMATICALLY TO A TRAILER AND METHOD FOR OPERATING SUCH A BRAKING SYSTEM

BACKGROUND AND SUMMARY OF THE INVENTION

The invention relates to a braking system for a utility vehicle which can be coupled pneumatically to a trailer, having at least one electronic control unit, a valve device which can be switched electrically by the at least one electronic control unit, wherein in a switched state of the valve device pressure can be built up for the trailer braking system, which pressure brings about braking of the trailer, and a pressure sensor which senses the pressure for the trailer braking system and transmits a corresponding signal to the electronic control unit, wherein the pressure for the trailer braking system can be influenced by the electronic control unit by pulsed switching of the valve device taking into account the pressure, sensed by the pressure sensor, for the trailer braking system.

The invention also relates to a method for controlling a braking system for a utility vehicle which can be coupled pneumatically to a trailer, having at least one electronic control unit, a valve device which can be switched electrically by the at least one electronic control unit, wherein in a switched state of the valve device pressure can be built up for the trailer braking system, which pressure brings about braking of the trailer, and a pressure sensor which senses the pressure for the trailer braking system and transmits a corresponding signal to the electronic control unit, wherein the pressure for the trailer braking system is influenced by the electronic control unit by pulsed switching of the valve device taking into account the pressure, sensed by the pressure sensor, for the trailer braking system.

In conjunction with utility vehicles which can be coupled to a trailer, it is known to stabilize the driving behavior by means of what is referred to as an anti-jackknifing braking function. The anti-jackknifing braking function prevents the trailer reaching a higher speed than the traction vehicle on sections of road with a negative gradient, since such a situation could ultimately lead to jackknifing of the vehicle combination and therefore to a very unsafe driving situation. Such an anti-jackknifing braking function can be implemented, in particular, by pulsed actuation of valves which influence the brake pressure of the trailer braking system. The pulsed actuation can, for example, be carried out in a frequency-modulated fashion and, in particular in the case of constant frequency, in a pulse-width-modulated fashion. The actuated valves may be, in particular, switching valves which are primarily provided for switching over between a ventilating state and a venting state, that is to say which are in principle not intended to make available a metered pressure supply. Quasi-continuous metering of pressure in the region of the modulated compressed air can be achieved by virtue of the fact that such switching valves are actuated, for example, in a pulse-width-modulated fashion, that is to say they can be switched over with a certain pulse duty factor between the ventilating state and the venting state. However, it is problematic that pulsed actuation of the switching valves leads to extremely high load change rates, as a result of which the valves are heavily loaded and their service life is restricted.

The invention is based on the object of reducing the loading of switching valves in conjunction with an anti-jackknifing braking function made available by means of pulse width modulation, in order to improve the vehicle stability.

The invention is based on the generic braking system by virtue of the fact that the electronic control unit permits the pulsed switching in order to bring about braking of the trailer when the service brake of the traction vehicle is not active only if a condition applies according to which braking of the trailer could be appropriate despite the service brake of the traction vehicle not being active, and such anti-jackknifing braking is requested by a signal generator. The invention therefore makes available a type of filter which ensures that no unnecessary actuation of the switching valves takes place outside actually desired and appropriate anti-jackknifing braking phases. The switching valves are therefore no longer subjected to continuous pulsed actuation whenever the driver of the utility vehicle makes a corresponding request via a signal generator, and this has a positive effect on the service life of the actuated solenoid valves and brakes. The pulsed actuation can lead, for example, in a pulse-width-modulated fashion to variation of the pressure to be influenced, and the invention is mainly explained using the example of pulse width modulation within the scope of the present disclosure without restricting the generality. The above-mentioned pressure for the trailer braking system may be a control pressure on the basis of which the actual brake pressure for the trailer braking system is generated.

In particular it is possible to provide that the condition corresponds to the presence of at least one of the following states: the vehicle speed is lower than a threshold value, the accelerator pedal is not activated, the engine is braking, the engine is not generating any usable torque, a retarder system is active, the vehicle is located on a section of road with a negative gradient. Such a driving state is frequently present during sustained-action braking since the traction vehicle is then braked by the engine and the retarder system while the trailer is not braked. The retarder system and the engine brake are also referred to as sustained-action brakes. They are frequently activated by a separate signal generator or switch, these switches usually being switched in a stepped fashion. Arrangements in which the engine brake can be switched on independently of the retarder system are also known, but in this context there is usually a possibility of exerting combined influence and carrying out resulting adjustment of the systems with respect to one another. There is frequent provision for the sustained-action braking deceleration to be adjusted automatically to the deceleration of a preceding braking operation by a service brake. The signal generator for the anti-jackknifing braking can be provided separately or combined with the signal generator for the engine braking or the retarder braking. It is also possible to equip the manual control unit for an electric parking brake with an additional function with the result that the signal for the initiation of anti-jackknifing braking can be generated in this way. The condition for the approval of the anti-jackknifing braking can be coupled to the characteristic driving states of the vehicle on this basis. In this context it is possible to take into account only one driving state or else also a plurality of driving states, in particular all the specified driving states. It is possible, for example, to prevent pulse-width-modulated actuation of the switching valves, that is to say the solenoid valves, from taking place if the vehicle is moving at a high speed at which an anti-jackknifing braking function should not occur. It is also possible to provide that when the accelerator pedal is actuated an anti-jackknifing braking function is prevented in all cases because it is improbable that the trailer could run into the rear of the traction vehicle in such a state. Furthermore, a criterion for the approval of the anti-jackknifing braking can be that the engine is braking since this characterizes a typical driving situation which makes anti-jackknifing braking appear appropriate or necessary. Furthermore, it is possible to check, in particular by means of the engine control device, whether the engine is generating a usable positive torque. If this is not the case, this is a criterion for permitting the anti-jackknifing braking. Through combined sustained-action braking using a retarder system it is also possible to bring about deceleration of the utility vehicle. If such a retarder system is active, it may be appropriate to permit anti-jackknifing braking. It is also possible to check whether the vehicle is located on a section of road with a negative gradient, in which case this checking is carried out on the basis of an inclination sensor system or of navigation data. If this checking reveals that a negative gradient is not present, the pulse-width-modulated actuation of the switching valves can also be suppressed. During the control of the anti-jackknifing braking function it is also possible to take into account the wheel speeds of the traction vehicle and trailer as well as the steering angle. It is possible, for example on the basis of a slip comparison between the trailer and the traction vehicle, to determine that the trailer is about to run into the rear of the traction vehicle. Taking into account the steering angle may be appropriate since at different steering angles the vehicle is influenced by anti-jackknifing braking in different ways. With respect to the driving behavior of the utility vehicle it may also be appropriate to take into account the different load distribution, brought about by an e differential, on a sustained-action braking operation which is brought about, in particular, by the engine and a retarder brake. An e differential is a stepless differential for adapting engine acceleration torques to the forces which can be applied to the underlying surface by the wheels. An e differential distributes the wheel forces individually along the various wheels in an appropriate way. Subsequent to a sustained-action braking operation it is appropriate, when the vehicle accelerates due to the accelerator pedal being actuated, to extend the vehicle combination as quickly as possible and not permit the engine speed to drop into a range in which the engine could stall under certain circumstances. In this context it may be desired to release the anti-jackknifing brake before the transition to renewed acceleration of the vehicle combination, which reduces the overall loading on components. Further consideration can also be given to the travel sensor system of the chassis control system and of the pneumatic suspension, which, together with the steering angle and the slip during cornering, provide a point of reference via the shearing forces of the trailer when the sustained-action braking system is activated. Modern vehicles also frequently have an active steering system which can make available steering angle signals to the control electronics during the anti-jackknifing braking process in order to perform an automatic steering angle correction. On this basis, an anti-jackknifing braking process can be ended early in order in this way also to reduce the loading on the components and to improve the driving stability. Furthermore, if an active shock absorber control system is present, it may be helpful to adjust the shock absorber to a higher degree of hardness in order to prevent rolling movements and also in this way to be able to end an anti-jackknifing braking process more quickly, and this also reduces loading on the controlling components, that is to say the valves and the brakes, and improves the driving stability.

There is advantageously provision that a pressure limiter is connected upstream of the valve device. A pressure limiter is appropriate since the number of necessary switching cycles also rises owing to the requirement for more frequent and more sensitive clocking as the supply pressure increases. The pressure limiter therefore has an advantageous influence on the service life of the valves.

It is possible to provide that the valve device is a 3/2-way valve. On this basis, it is possible to implement a venting and ventilation function with a single valve.

It is also possible to provide that the valve device comprises two 2/2-way valves. One of the 2/2-way valves is then used for venting, while ventilation is carried out with the other. If neither of the valves is actuated, the pressure is maintained, in which case ventilation and venting is carried out very frequently during anti-jackknifing braking owing to the critical driving situation.

It is possible for the valve device to make the control pressure available directly. Such a valve device which is configured as a solenoid valve must make available a sufficient flow cross section.

It is also conceivable for the valve device to actuate a relay valve which makes the control pressure available. It is advantageous for the valve device which is actuated in a pulse-width-modulated fashion to make the control pressure available indirectly via a relay valve since the switching valves which are actuated in a pulse-width-modulated fashion can then be dimensioned and configured independently of the control pressure which is necessary for the anti-jackknifing braking. The pressure pulses are integrated in the control chamber of the relay valve to form a median pressure which is then fed as a control pressure preset value to the trailer braking system.

According to one preferred embodiment of the present invention there is provision for the valve device to be integrated into a trailer control module which controls the trailer braking system and supplies it with compressed air.

However, it is also conceivable for the valve device to be integrated into an electropneumatic control unit which pneumatically controls the parking brake of the traction vehicle and the trailer braking system via a trailer control module.

In this context it is then advantageous that at least one throttle which, in the event of a reduction in pressure in the region of a control inlet of the trailer control module, delays a reduction in pressure in a spring-loaded cylinder, is provided in a line system of the electropneumatic control unit, which line system is connected to the spring-loaded cylinder of the parking brake of the traction vehicle and to the control inlet of the trailer control module. Since the electropneumatic control unit couples both the control inlet of the trailer control module and the parking brake cylinders to the compressed air supply, a loss of pressure in the region of the trailer control module could bring about a sudden collapse of the pressure in all the lines of the electropneumatic control unit which are connected thereto, and therefore also in the region of the spring-loaded cylinder. This would result in the traction vehicle being suddenly braked by the parking brake. This is prevented by slowing down a reduction in pressure in the region of the spring-loaded cylinders by means of throttling.

Taking this as a basis, it is then also possible to provide that an unexpected reduction in pressure in the region of the control inlet of the trailer control module can be sensed by the pressure sensor, and the pressure in the spring-loaded cylinder of the parking brake can be held by switching over a valve. The pressure sensor, which is also used in conjunction with the pulse-width-modulated actuation of the valve device, can therefore be employed to sense an unexpected drop in the pressure in the region of the trailer control module and to then disconnect the spring-loaded cylinder from the pressure reducer by switching over a valve device. In combination with the throttling of pressure it is therefore possible firstly to slow down the reduction in pressure in the spring-loaded cylinder independently of the switching over and sensing of pressure, and then to stop it completely, if necessary, by switching over the valve.

It is advantageously possible to provide that a signal which can be generated by a signal generator which can be operated manually can be fed to the at least one electronic control unit, and the anti-jackknifing braking function can be suppressed as a function of the presence of the signal. This provides the driver with the possibility of switching off the anti-jackknifing braking functionality of the utility vehicle from the outset.

It is also possible to provide that a variable signal which can be generated by a signal generator which can be activated manually in different ways can be fed to the at least one electronic control unit, wherein at least one property of the signal depends on the method of activation of the signal generator, and the at least one property of the signal influences the braking behavior of the trailer. In particular, it is possible to provide a signal generator which can be activated in different ways. The pressure which is built up for the trailer brake can therefore be influenced as a function of the signal generator travel.

It is likewise possible to provide that a signal which can be generated by a signal generator which can be activated manually can be fed to the at least one electronic control unit, wherein the activation time of the signal generator influences the braking behavior of the trailer. It is therefore possible, for example, to provide that a relatively high pressure is built up when the signal generator is activated for a relatively long time.

There is also advantageously provision that wheel speed sensors are provided whose signals can be fed to the at least one electronic control unit, and that the vehicle speed which is used in conjunction with the condition for the approval of pulsed switching of the valve device can be derived from signals of the rotational speed sensors. On the basis of a comparison of the trailer and the traction vehicle with respect to slip it is possible to determine, for example, that the trailer is about to run into the rear of the traction vehicle. On the part of the traction vehicle, the tachometer signal or data from a navigation system could additionally be used as correction values. Using active wheel speed sensors permits, in particular at low rotational speeds, the provision of values which can be processed very well, which permits rapid stabilization of the vehicle.

It is also possible to provide that the trailer braking system has disk brakes. This is appropriate, in particular in combination with active wheel speed sensors, since disk brakes permit sensitive pressure reduction and improved meterability with low hysteresis, in particular at low vehicle speeds. In particular in the case of difficult conditions of the underlying surface, for example with chippings (U chippings) it is therefore possible to avoid undesired locking of the wheels.

The invention is based on the generic method in that the electronic control unit permits the pulsed switching in order to bring about braking of the trailer when the service brake of the traction vehicle is not active only if a condition applies according to which braking of the trailer could be appropriate despite the service brake of the traction vehicle not being active, and such anti-jackknifing braking is requested by a signal generator.

In this way, the advantages and particularities of the braking system according to the invention are also implemented within the scope of a method. This also applies to the particularly preferred embodiments of the method according to the invention which are disclosed below.

Said method is advantageously developed by virtue of the fact that the condition corresponds to the presence of at least one of the following states: the vehicle speed is lower than a threshold value, the accelerator pedal is not activated, the engine is braking, the engine is not generating any usable torque, a retarder system is active, the vehicle is located on a section of road with a negative gradient.

Furthermore, it is possible to provide that an unexpected reduction in pressure in the region of the control inlet of the trailer control module is sensed by the pressure sensor, and the pressure in the spring-loaded cylinder of the parking brake is held by switching over a valve.

It is also preferred that a temperature in the region of the trailer braking system is sensed, and when a predefined temperature threshold is exceeded the pressure for the trailer braking system is reduced. This is a safety measure on the basis of which the loading on the trailer braking system and the valves is reduced.

In this context it is also possible to provide that a temperature in the region of the trailer braking system is sensed, and when a predefined temperature threshold is exceeded anti-jackknifing braking is prohibited.

It is possible to take a further safety measure, specifically in that a time during which anti-jackknifing braking is carried out is sensed, and in that when a predefined time threshold is exceeded further anti-jackknifing braking is prohibited. This also prevents possible overloading of the components involved in the anti-jackknifing braking.

It is also possible to provide that during anti-jackknifing braking the activity of the service brake of the traction vehicle is monitored, and that when the service brake of the traction vehicle is activated further anti-jackknifing braking is prohibited. Anti-jackknifing braking in the specific sense is then no longer necessary since the entire braking system of the utility vehicle is activated and it will stop the vehicle combination in an extended state.

It is particularly advantageous that during anti-jackknifing braking the rotational speed of the engine of the utility vehicle is monitored. This monitoring of the rotational speed can be performed, for example, via the engine control device of the utility vehicle, with information relating to this being transmitted to the electronic control unit which is responsible for the anti-jackknifing braking. Such monitoring of the rotational speed is advantageous since in an unfavorable case the anti-jackknifing braking can cause the rotational speed to drop to a range in which the engine can be expected to stall. This should be prevented since then all or virtually all of the functional elements of the vehicle go into a back-up operating mode by changing over, for example, from an electronic control to a pneumatic control, with the result that only a very restricted functionality of the entire braking system is still available. In critical driving situations this adversely affects the maneuverability.

In this context it may be advantageous for the pressure for the trailer braking system to be reduced when a predefined rotational speed threshold is undershot.

Furthermore it is possible to provide that when a predefined rotational speed threshold is undershot the rate of supply of fuel to the engine of the utility vehicle is increased.

As a measure against stalling of the engine it is also possible to provide that when a predefined rotational speed threshold is undershot the charge pressure of a turbocharger is reduced.

Furthermore it is possible that when a predefined rotational speed threshold is undershot compressed air is fed to the engine of the utility vehicle from a compressed air vessel of a compressed air system of the utility vehicle.

Stalling of the engine can also be prevented by a clutch in a drive train of the utility vehicle being at least partially opened when a predefined rotational speed threshold is undershot.

It is also possible to provide that a transmission of the utility vehicle is adjusted to a transmission position with a reduced transmission ratio when a predefined rotational speed threshold is undershot.

As a further measure against stalling of the engine it is possible to provide that the effect of the retarder system of the utility vehicle is reduced when a predefined rotational speed threshold is undershot.

It may also be beneficial for a bypass valve which is arranged between swept volumes of different cylinders of the engine for the purpose of engine braking to be at least partially closed. Such a bypass valve carries out compression work during engine braking by permitting the compressed volume to overflow into the sucking-in piston. Since the bypass valve is closed when there is an excessive drop in rotational speed, the effect of the engine braking can be decreased.

Furthermore it is possible to provide that a throttle valve in an exhaust stream of the engine is adjusted from a throttling position into a less throttling position.

As has already been described in relation to the braking system according to the invention, the method according to the invention can advantageously be developed by virtue of the fact that a signal which is generated by a signal generator which can be operated manually is fed to the at least one electronic control unit, and the anti-jackknifing braking function is suppressed as a function of the presence of the signal.

It is also advantageous that a variable signal which is generated by a signal generator which can be activated manually in different ways is fed to the at least one electronic control unit, wherein at least one property of the signal depends on the method of activation of the signal generator, and the at least one property of the signal influences the braking behavior of the trailer.

The method according to the invention can also be favorably developed by virtue of the fact that a signal which is generated by a signal generator, which can be activated manually is fed to the at least one electronic control unit, wherein the activation time of the signal generator influences the braking behavior of the trailer.

It is also possible for wheel speed sensors to be provided whose signals are fed to the at least one electronic control unit, and for the vehicle speed which is used in conjunction with the condition for the approval of pulsed switching of the valve device to be derived from signals of the rotational speed sensors.

The invention will now be explained by way of example on the basis of particularly preferred embodiments and with reference to the accompanying drawings.

DETAILED DESCRIPTION OF THE DRAWINGS

In the following description of the drawings, identical reference symbols denote identical or comparable components.

Figure 1:
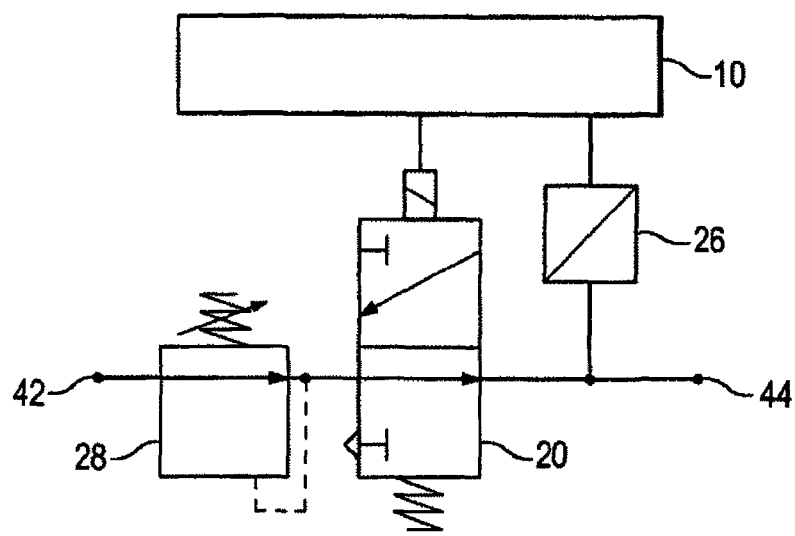
FIG. 1 shows part of a braking system according to the invention.

FIG. 1 shows part of a braking system according to the invention. Compressed air supplied from a compressed air supply 42 is fed to a 3/2-way valve 20 via a pressure limiter 28. On the output side the 3/2-way valve 20 is connected to a trailer control port 44. The output-side pressure of the 3/2-way valve 20 can be sensed with a pressure sensor 26. This pressure sensor transmits the acquired information to an electronic control unit 10 which performs open-loop or closed-loop control of the state of the 3/2-way valve 20 as a function thereof and as a function of other conditions. In order to make available a variable pressure at the trailer control port 44 in a selective fashion, the 3/2-way valve 20 is actuated in a pulse-width-modulated fashion.

Figure 2:
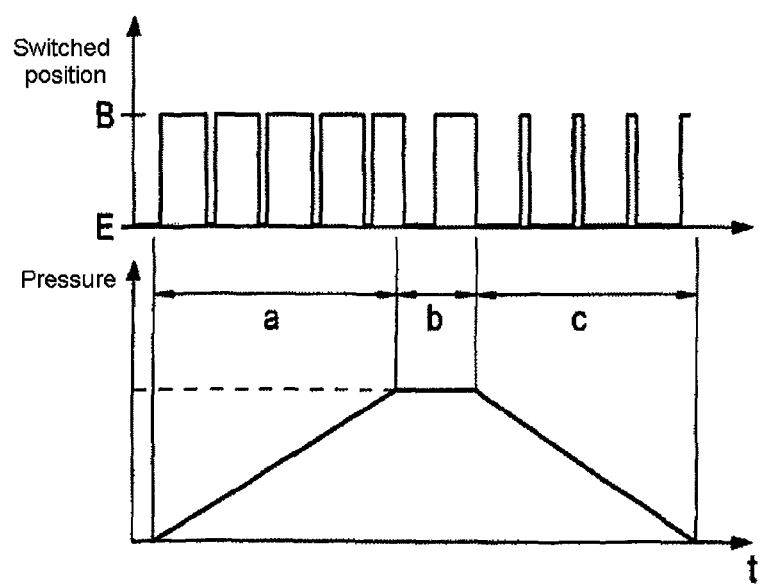
FIG. 2 shows a diagram illustration explaining pulse-width-modulated actuation of a valve device.

FIG. 2 shows a diagram illustration explaining pulse-width-modulated actuation of a valve device. The upper diagram shows the switched state of the valve device 20 according to FIG. 1. In the switched state B, the valve device 20 is in its ventilated position, while in the switched state E the venting position is present. For example, the 3/2-way valve 20 is de-energized in the switched state B, and energized in the switched state E. In the lower diagram, the progression of the pressure at the trailer control port 44 according to FIG. 1 is shown as a function of the switched states of the 3/2-way valve 20 which are shown in the upper diagram. During the phase a, the ratio between the ventilation time and the venting time is adjusted in such a way that a pressure increase takes place. During the phase b, the pulse duty factor for the switched state is changed in favor of the venting switched position, with the result that the pressure at the trailer control port 44 can be held. If the venting switched position still takes up a larger time proportion than the ventilating switched position, as is the case in phase c, a pressure decrease takes place. Depending on the implementation of the present invention, the pressure which is illustrated in the lower diagram can be a control pressure which is fed to the trailer control module and on the basis of which the trailer brake pressure is influenced, or can be the trailer brake pressure directly. In the latter case, the pressure-holding phase b could be set at, for example, approximately 8.5 bar.

Figure 3:
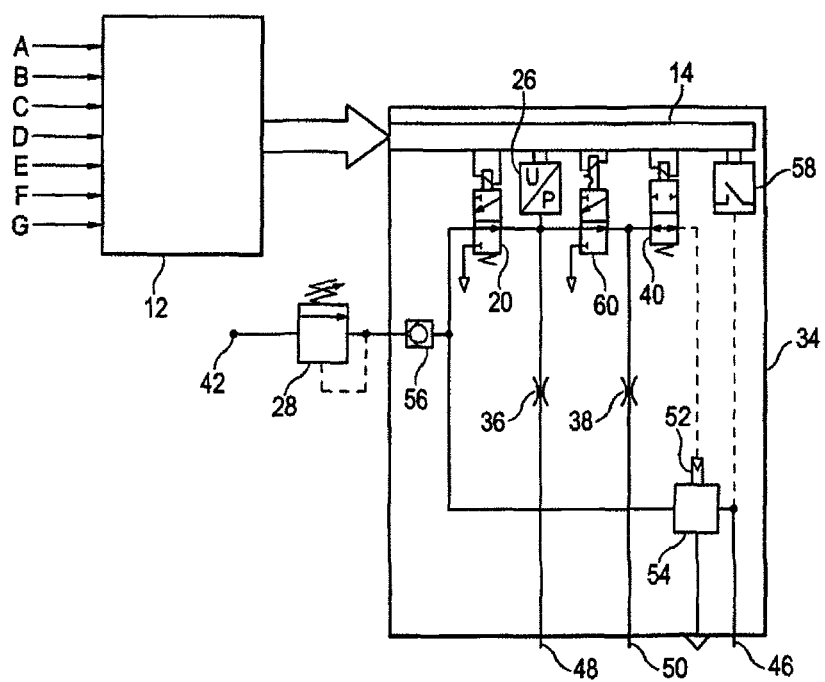
FIG. 3 shows a block circuit diagram explaining a first embodiment of a braking system according to the invention.

FIG. 3 shows a block circuit diagram explaining a first embodiment of a braking system according to the invention. In this example, the valve device 20 which can be controlled in a pulse-width-modulated fashion is integrated into an electropneumatic control unit 34 which has both a spring energy store port 46 and two control ports 48, 50 which can be coupled to a control inlet of a trailer control module. The electropneumatic control unit 34 is preferably suitable for making available the functions of an electronic parking brake system. For this purpose, the control unit 34 contains an electronic control unit 14 which is suitable for actuating various solenoid valves, specifically the valve device 20 which is configured as a 3/2-way valve and is essential in conjunction with the present invention and a 2/2-way valve 40. The control inlet 52 of a relay valve 54 is actuated as a function of the switched position of these abovementioned valve devices 20, 40. Working pressure is supplied to the relay valve by the compressed air supply 42 via the pressure limiter 28 and a nonreturn valve 56, which pressure is passed on to the spring energy store port as a function of the control pressure present at the control inlet 52. A pressure switch 58 by means of which it is possible to sense whether the spring energy store port is ventilated or vented, that is to say whether the parking brake is engaged or released, is also provided. In the illustrated position of the 2/2-way valve 40, the spring energy store port 46 can be ventilated or vented as a function of the position of the 3/2-way valve 20. If the 2/2-way valve 40 is switched over, the pressure at the spring energy store port 46 is held.

By means of the interplay of the 3/2-way valve 20 with the 2/2-way valve 40, it is also possible to implement a test function for the utility vehicle by virtue of the fact that specifically when the spring energy store port 46 is vented the control inlet, connected to the control port 28, of the trailer control module is briefly ventilated via said control port 28. Ventilating this control inlet results in venting of the trailer braking system, with the result that the entire utility vehicle has to be held in this state by the traction vehicle, in which case the vented state of the spring energy store port can be maintained by switching over the 2/2-way valve 40 into its pressure-holding position.

A further important task is performed by the 3/2-way valve 20 with respect to the anti jackknifing braking function. Since the 3/2-way valve 20 is actuated in a pulse-width-modulated fashion by the electronic control units 12, 14, a selective pressure can be made available at the control port 48 for the trailer control module. In particular, the trailer can be braked independently of the braking of the traction vehicle, with the result that it is possible to prevent the trailer from running into the rear of the traction vehicle. Whether such anti jackknifing braking is permitted depends on the driving state of the vehicle. Taking this into account makes it possible to take into account safety-critical aspects, for example steering maneuvers, and it is possible to ensure that pulse width modulation of the 3/2-way valve 20 takes place only if the anti jackknifing braking functionality is actually required, which greatly increases the service life of the 3/2-way valve 20. The checking as to whether the pulse width modulation of the 3/2-way valve 20 is actually permitted is made dependent on the signals A, B, C, D, E, F and G. These signals characterize the following driving states of the vehicle or are derived from these driving states, for example by comparisons with threshold values:

A: Speed of the vehicle B: Engine torque C: Retarder status information D: Steering angle or differential rotational speed of wheels E: State of switches for accelerator pedal and engine brake F: Inclination G: Driver's request signal generator signal The information about these driving states can be obtained from a wide variety of sources. The speed of the vehicle can be obtained, for example, from the anti-block brake system or from the tachograph of the vehicle. It is also possible to use active wheel speed sensors since their signals are more precise, in particular at low speeds, than the signal from the tachograph. In addition, speed values of the navigation system can be included in the calculation as absolute values. The torque of the engine is available, for example, within the scope of the engine control system. Wheel speed sensors are present for the steering angle or differential rotational speed of the wheels. The signals can basically be obtained directly or via a databus. In order to sense the inclination of the vehicle, it is also necessary, in particular, to determine that said inclination can be sensed by a sensor system; however the inclination information can also be made available by the navigation system.

The discussed signals and, under certain circumstances, further signals or variables derived therefrom are input into the control unit 12. Said control unit 12 may be, in particular, a control device with a watchdog function. A watchdog function is advantageous since it is a safety-relevant control function in the context of the present invention in which a microcontrol system and a computer system are failsafe and have to at least partially switch themselves off in the event of a fault. Such control devices are advantageously provided with a redundant power supply and they have a read/write memory in order to store the permissible open-loop and closed-loop control parameters as well as predefined threshold values, for example a speed threshold value, and fault states. The control device can be arranged outside the electropneumatic control unit 34 or else integrated therein, in particular in a structural unit with the electronic control unit 14 which is illustrated inside the electropneumatic control unit 34. The electronic control unit 12 then brings about the pulse-width-modulated actuation of the 3/2-way valve 20 as a function of the signals A, B, C, D, E and F, in which case pulse-width-modulated actuation can be prohibited in particular if it is clear, from one or more of the information items supplied to the control unit, that anti-jackknifing braking should not take place.

The electropneumatic control unit 34 contains a further electrically actuable 3/2-way valve 60, which is equipped as a bistable valve. This solenoid valve 60 supplies the control port 50 of the electropneumatic control unit 34 with compressed air, with the result that the electropneumatic control unit 34 illustrated can make available a control pressure for the trailer control module, on the basis of either a monostable valve configuration, specifically via the 3/2-way valve 20, or of a bistable valve configuration, specifically via the 3/2-way valve 60. The electropneumatic control unit 34 can therefore cope with various requirement profiles of the utility vehicle manufacturers.

A further advantageous property of the electropneumatic control unit 34 relates to the throttles 36, 38 which are provided in the line paths to the control ports 48, 50 for the trailer control module. If, for example, an unexpected loss of compressed air occurs at the control port 48, the throttle 36 can ensure that this does not lead to sudden venting of the spring energy store port 46.

Figure 4:
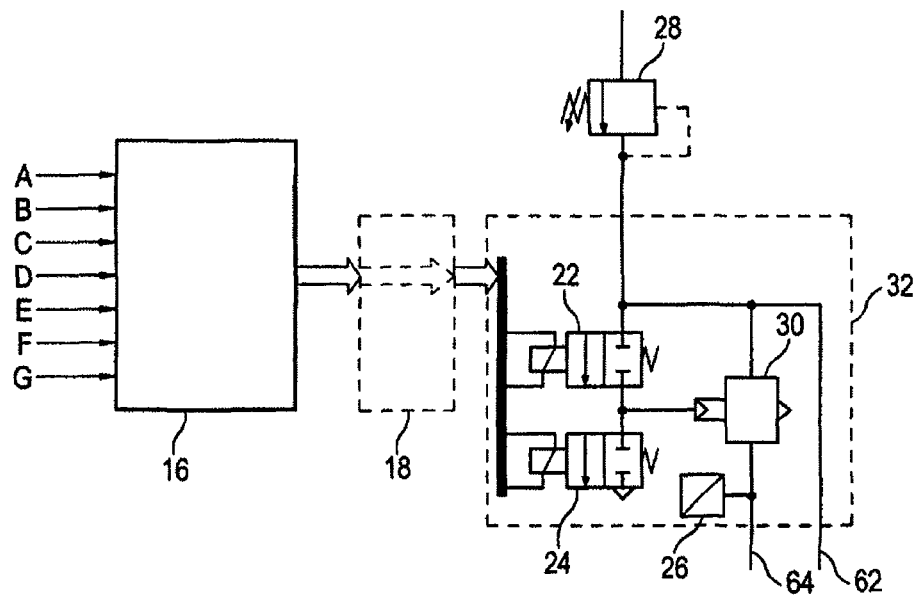
FIG. 4 shows a block circuit diagram explaining a second embodiment of a braking system according to the invention.

FIG. 4 shows a block circuit diagram explaining a second embodiment of a braking system according to the invention. In the exemplary embodiment illustrated here, the valve device which can be actuated in a pulse-width-modulated fashion is integrated into the trailer control module 32. The latter has a supply line port 62 for the trailer and a trailer brake line port 64. The trailer control module 32 is in turn supplied via a pressure limiter 28, downstream of which the valve device, here having two 2/2-way valves 22, 24, which can be actuated in a pulse-width-modulated fashion is connected. The valve device 22, 24 is actuated according to the same basic principle as that which has already been explained in conjunction with figure 3. However, the pulse width modulation can take place, for example, with a constant pulse length, in which case the first 2/2-way valve 22 is actuated in a pulsed fashion in order to ventilate the trailer brake line, while the second 2/2-way valve 24 remains de-energized, and the second 2/2-way valve 24 is actuated in a pulsed fashion for the purpose of venting when the first 2/2-way valve 22 is de-energized. In order to hold the pressure, both 2/2-way valves 22, 24 remain de-energized. In the present exemplary embodiment, the pressure supply of the trailer brake line is provided via a relay valve 30. A direct connection of the trailer brake line to the solenoid valves 22, 24 which can be actuated in a pulse-width-modulated fashion is also conceivable. Furthermore, a 3/2-way valve can also be used instead of the 2/2-way valves. With respect to the pressure sensor 26 it is to be noted that it monitors whether the pressure which is modulated for the trailer is within a permissible control window taking account of the specifications A to G. Furthermore, the hysteresis of the system is also included. The continuity of the rise in pressure is taken into account with respect to the tolerances of the relay valve 30 and as a function of the specifications A to G. The control device 16 can have an additional electrical connection via which an the anti-jack-knifing braking request at the control device of the trailer, for example at the trailer control module 32, is electrically passed on.

FIG. 4 illustrates by way of example that a further control device 18, for example a control device which is dedicated to the trailer control module and is configured as a slave control device, can be connected downstream of the control device 16, which can be, for example, of a comparable design to that of the control device 12 according to FIG. 3. The control device 18 therefore does not have any CAN interface, for example. The main computing work is performed via the primary control device 16 which is configured as a redundant control device with redundant power supply and an EEProm memory for storing parameters and threshold values, and as a fault memory.

The solution with two 2/2-way valves with or without a relay valve connected downstream is also possible in conjunction with the integration of the functionality according to the invention into the electropneumatic control unit 34 according to FIG. 3. With such an electropneumatic control unit as the one illustrated in FIG. 3 it is also possible to connect a relay valve downstream of a 3/2-way valve.

Figure 5:
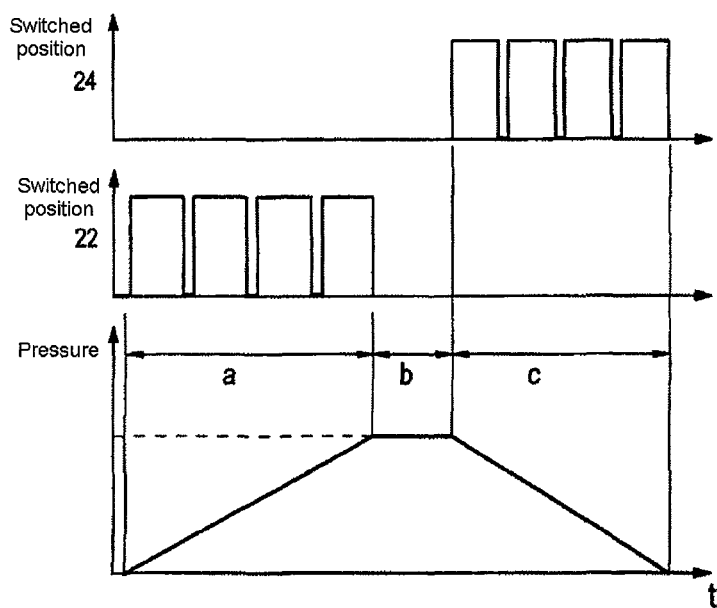
FIG. 5 shows a diagram illustration explaining pulse-width-modulated actuation of a valve device.

FIG. 5 shows a diagram illustration explaining pulse-width-modulated actuation of a valve device. The switched positions of a ventilation valve, for example of the valve 22 according to FIG. 4, and of a venting valve, for example of the valve 24 according to FIG. 4, and the associated modulated pressure profiles, for example the control pressure fed to the relay valve 30 according to FIG. 4 or the working pressure made available by the relay valve 30 at the trailer brake line port 64, are illustrated here. While the pressure is being built up, the venting valve 24 is continuously closed, while the ventilation valve 22 is actuated in a pulsed fashion. Consequently, a rise in pressure occurs. In order to hold the pressure, both valves 22, 24 remain closed. During the pressure reduction phase, the pressure build-up valve 22 remains closed while the venting valve 24 is actuated in a pulsed fashion and in this respect changes its switched position periodically.

The features of the invention which are disclosed in the description above, in the drawings and in the claims may be essential for the implementation of the invention, either individually or in any desired combination.

| Table of Reference Numerals | |
|---|---|
| 10 | Control unit |
| 12 | Control unit |
| 14 | Control unit |
| 16 | Control unit |
| 18 | Control unit |
| 20 | Valve device |
| 22 | Valve device |
| 24 | Valve device |
| 26 | Pressure sensor |
| 28 | Pressure limiter |
| 30 | Relay valve |
| 32 | Trailer control module |
| 34 | Control unit |
| 36 | Throttle |
| 38 | Throttle |
| 40 | 2/2-way valve |
| 42 | Compressed air supply |
| 44 | Trailer control port |
| 46 | Spring energy store port |
| 48 | Control port |
| 50 | Control port |
| 52 | Control inlet |
| 54 | Relay valve |
| 56 | Nonreturn valve |
| 58 | Pressure switch |
| 60 | 3/2-way valve |
| 62 | Supply line port |
| 64 | Trailer brake line port |

The invention claimed is:

1. A braking system for a utility vehicle which is coupleable pneumatically to a trailer, comprising:
at least one electronic control unit,
a valve device which is switchable electrically by the at least one electronic control unit, wherein in a switched state of the valve device pressure is capable of being built up for the trailer braking system, which pressure brings about braking of the trailer, and
a pressure sensor which senses the pressure for the trailer braking system and transmits a corresponding signal to the electronic control unit,
wherein the pressure for the trailer braking system can be influenced by the electronic control unit by pulsed switching of the valve device taking into account the pressure, sensed by the pressure sensor, for the trailer braking system,
wherein the electronic control unit permits the pulsed switching in order to brake the trailer in the case of an inactive service brake of the traction vehicle based on at least one driving state of the utility vehicle.

2. The braking system as claimed in claim 1, wherein the condition corresponds to the presence of at least one of the following states:
a vehicle speed lower than a threshold value,
an accelerator pedal that is not activated,
an engine that is braking,
an engine that is not generating any usable torque,
a retarder system is active, and
the vehicle being located on a section of road with a negative gradient.

3. The braking system as claimed in claim 1, wherein a pressure limiter is connected upstream of the valve device.

4. The braking system as claimed in claim 1, wherein the valve device is a 3/2-way valve.

5. The braking system as claimed in claim 1, wherein the valve device comprises two 2/2-way valves.

6. The braking system as claimed in claim 1, wherein the valve device makes the control pressure available directly.

7. The braking system as claimed in claim 1, wherein the valve device actuates a relay valve which makes the control pressure available.

8. The braking system as claimed in claim 1, wherein the valve device is integrated into a trailer control module, which controls the trailer braking system and supplies it with compressed air.

9. The braking system as claimed in claim 1, wherein the valve device is integrated into an electropneumatic control unit, which pneumatically controls a parking brake of the traction vehicle and the trailer braking system via a trailer control module.

10. The braking system as claimed in claim 9, wherein at least one throttle which, in an event of a reduction in pressure in the region of a control inlet of the trailer control module, delays a reduction in pressure in a spring-loaded cylinder, is provided in a line system of the electropneumatic control unit, which line system is connected to a spring-loaded cylinder of the parking brake of the traction vehicle and to the control inlet of the trailer control module.

11. The braking system as claimed in claim 10, wherein an unexpected reduction in pressure in the region of the control inlet of the trailer control module is senseable by the pressure sensor, and the pressure in the spring-loaded cylinder of the parking brake is held by switching over a valve.

12. The braking system as claimed in claim 1, wherein a signal generated by a signal generator, which can be operated manually, is fed to the at least one electronic control unit, and an anti jackknifing braking function can be suppressed as a function of the presence of the signal.

13. The braking system as claimed in claim 1, wherein a variable signal, which can be generated by a signal generator which can be activated manually in different ways, is fed to the at least one electronic control unit, wherein at least one property of the signal depends on a method of activation of the signal generator, and the at least one property of the signal influences the braking behavior of the trailer.

14. The braking system as claimed in claim 1, wherein a signal, which can be generated by a signal generator which can be activated manually, is fed to the at least one electronic control unit, wherein the activation time of the signal generator influences the braking behavior of the trailer.

15. The braking system as claimed in claim 2, wherein wheel speed sensors are provided, whose signals are fed to the at least one electronic control unit, and wherein the vehicle speed, which is used in conjunction with the condition for the approval of pulsed switching of the valve device, is derived from signals of the rotational speed sensors.

16. The braking system as claimed in claim 1, wherein the trailer braking system has disk brakes.

* * * * *